Dec. 14, 1943.   C. P. KUMLER   2,336,551
TROLLEY CONVEYER
Filed Sept. 24, 1941   4 Sheets-Sheet 1

INVENTOR.
Clifford P. Kumler,
BY
ATTY.

Dec. 14, 1943. C. P. KUMLER 2,336,551
TROLLEY CONVEYER
Filed Sept. 24, 1941 4 Sheets-Sheet 2

INVENTOR.
Clifford P. Kumler,
BY

Dec. 14, 1943.  C. P. KUMLER  2,336,551
TROLLEY CONVEYER
Filed Sept. 24, 1941  4 Sheets-Sheet 3

INVENTOR.
Clifford P. Kumler,
BY

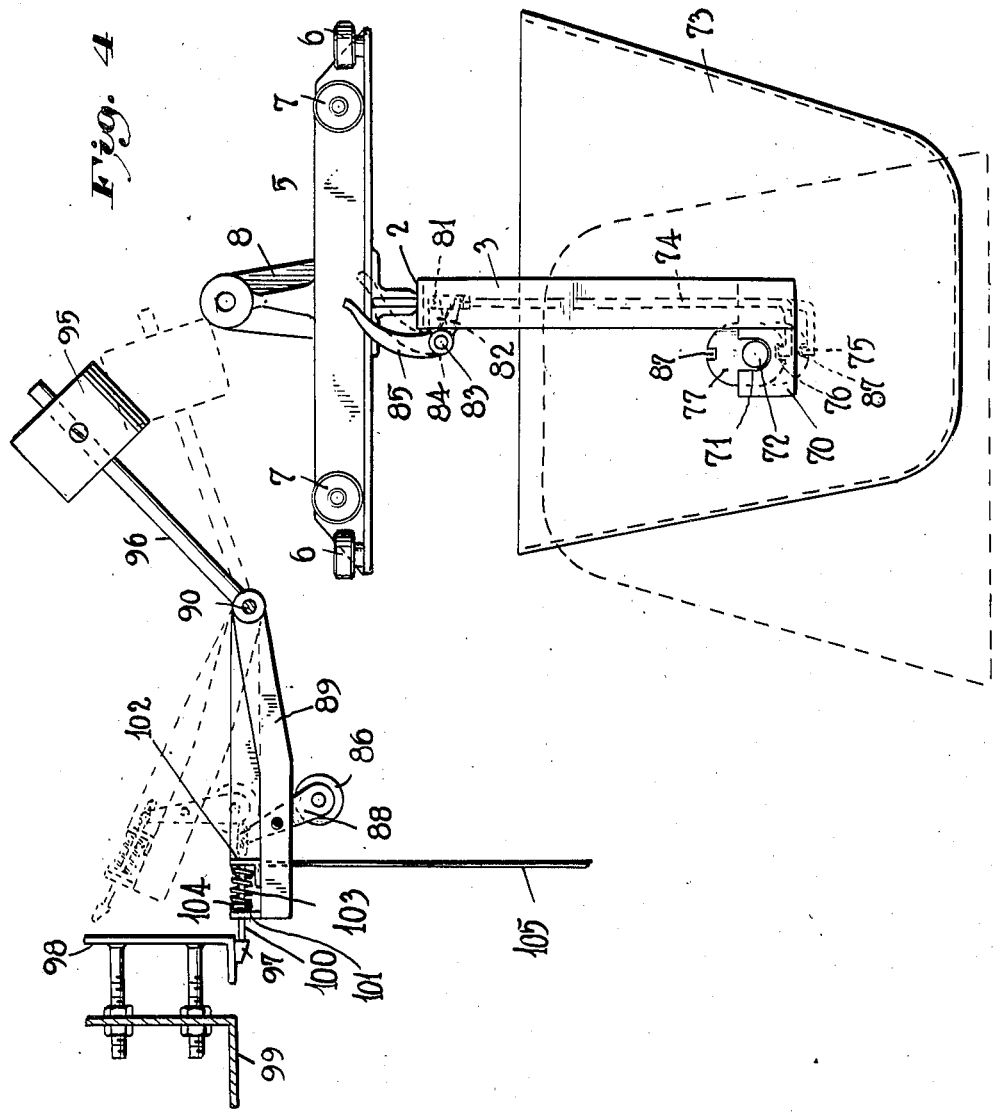

Patented Dec. 14, 1943

2,336,551

UNITED STATES PATENT OFFICE 2,336,551

TROLLEY CONVEYER

Clifford P. Kumler, Dayton, Ohio, assignor to Mathews Conveyer Company, Ellwood City, Pa., a corporation of Pennsylvania Application September 24, 1941, Serial No. 412,171

4 Claims. (Cl. 214—60)

This invention relates to conveyers and more particularly to conveyer systems that are adapted to distribute material from a loading station to one of any number of work stations. In the particular embodiment of the invention herein illustrated and described, the conveyer system is of the continuous type providing for the return of the empty carrier to the loading station after the material has been discharged. This conveyer system is primarily intended for use in carrying and distributing tobacco from a storage room to a number of machines used in the manufacture of cigars, cigarettes, etc., but the invention could obviously be used in conveyer systems for other materials.

The conveyer systems previously used for this purpose either had a mechanism on the carrier for selectively dispatching the material to a particular work station, or had operator controlled mechanisms at the work stations for causing the load to discharge when addition material was required. In the selective dispatch type of system, the material was discharged at the selected station whether or not that station needed additional material. The systems having operator controlled mechanisms could only accommodate one type or class of material so machines using different materials would have to be serviced by separate conveyer systems.

The primary object of the present invention is to provide a conveyer system with means for dispatching material to selected stations and with means controlled by the operators at those stations for automatically effecting discharge of the material.

Another object of the invention is to provide a conveyer system of the selective dispatch type with load discharging means on the carrier and at the station both movable to inoperative position when a load is discharged.

A further object of the invention is to provide a conveyer system having detachable bucket carriers with means for inverting the buckets on certain carriers at selected stations to discharge material at these stations.

A still further object of the invention is to provide a conveyer system having detachable bucket carriers with means for dispatching the carriers to selected stations and means controlled by operators at said stations for causing material to be discharged from the carriers.

With these and other objects in view, the invention may be said to consist in the various combinations and novel arrangements of parts used in the assembly of a conveyer system such as that hereinafter described.

In the drawings accompanying and forming a part of this specification, wherein like numerals designate corresponding parts throughout the several views, Figure 1 is a front elevation of a carrier in the system showing the carrier approaching a work station;

Figure 4 is a side elevation thereof.

Figure 1:
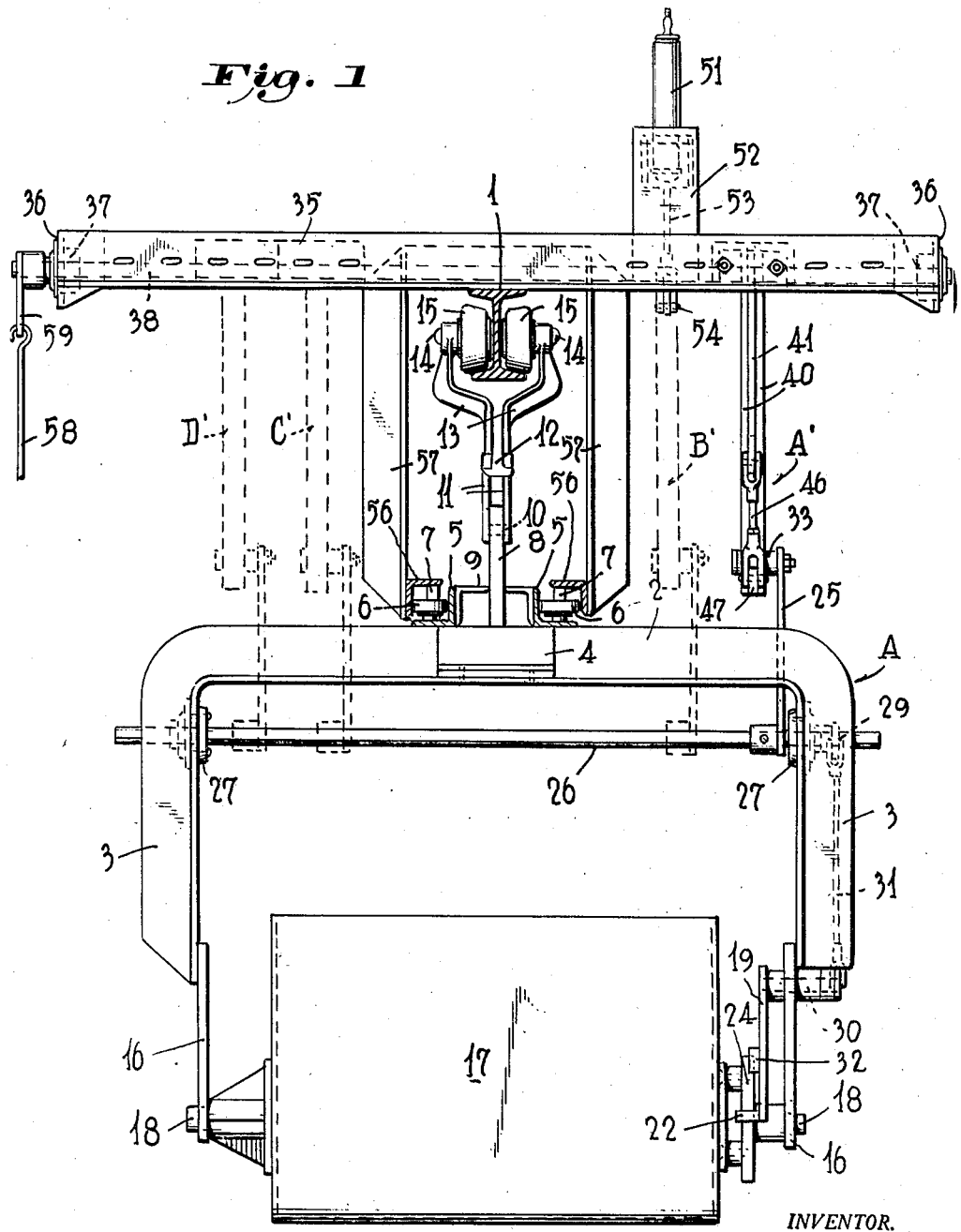
Figure 2:
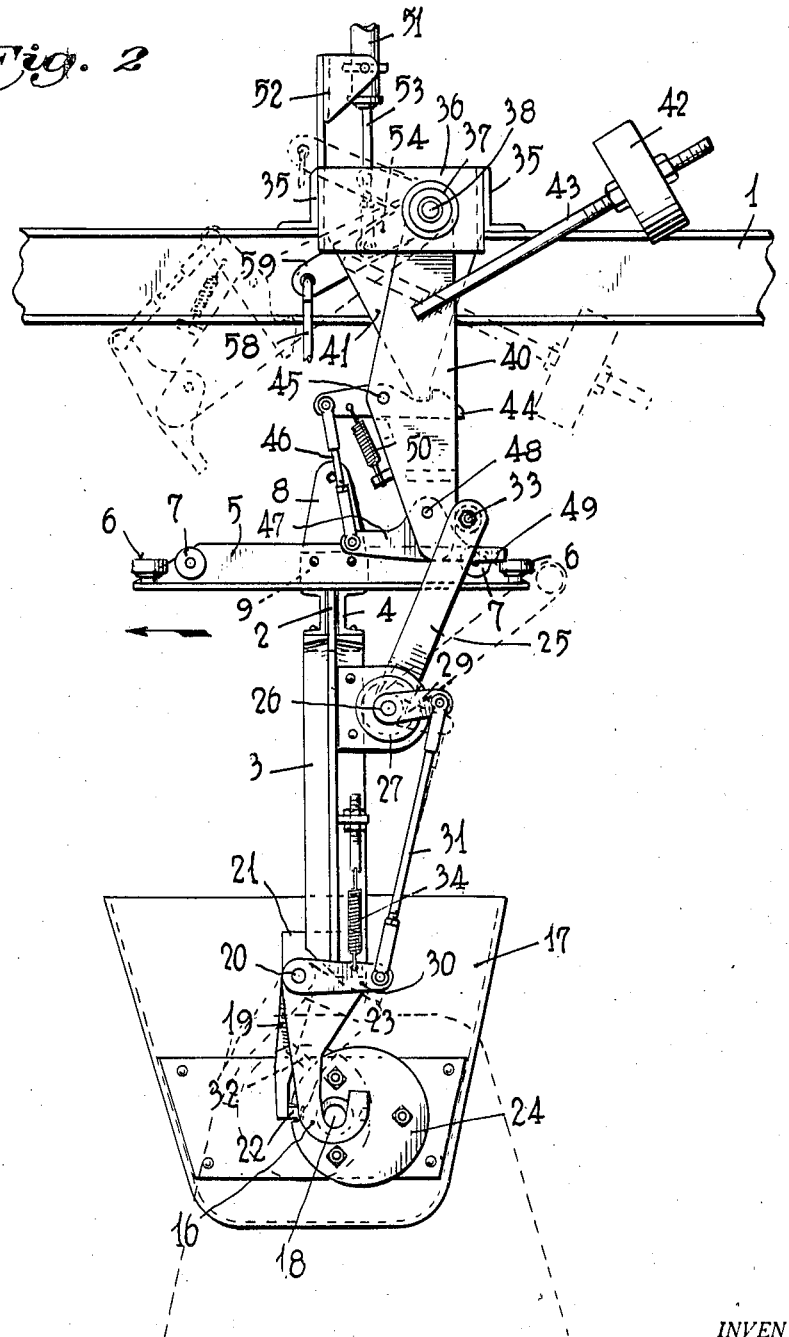
Figure 2 is a side elevation thereof.

The carrier shown in Figures 1 and 2 of the drawings is for a conveyer system for handling four different classes of material. This number of different materials is solely for purposes of illustration. The carrier may be readily adapted for use in systems handling any number of different materials without departing from the scope of the invention. The conveyer system shown in these drawings comprises an endless track 1, which has a cross section similar to the well known I beam and is usually suspended from the ceiling. The invention contemplates the use of any number of carriages suspended from the track 1, similar to the one shown in the drawings.

Each carriage has a frame formed of an inverted U-shaped member having a top portion 2 extending transversely of the track 1, and depending supports 3—3 at opposite ends of the top portion 2. A pair of brackets 4—4 on the top portion 2 support a pair of longitudinally disposed angle iron members 5—5 in transversely spaced relation. Each of the members 5 carries a pair of horizontal guide wheels 6 and a pair of vertical guide wheels 7 to steady the carriage when it passes a work station as will be more fully described hereinafter.

A plate 8 is supported on top of the carriage frame by brackets 9—9 that are secured to the angle iron members 5. A pin 10 is journaled in the plate 8 to pivotally support the carriage frame between bifurcated ends 11—11 of a suspension member 12. The suspension member 12 has a pair of arms 13—13 carrying axles 14—14 which hold wheels 15—15 in position to roll along track 1. A power driven chain (not shown) may be connected to the suspension member 12 in any suitable manner to propel the suspended carriage along the track 1.

Each of the depending supports 3 has a hook 16 secured to its lower end portion for carrying a detachable bucket 17. The bucket 17 has trunnions 18 secured on its opposite sides and adapted to be inserted in the hooks 16 to support the bucket in the carriage. It will be noted that the trunnions 18 are positioned below the center of the bucket so the weight of the bucket and the load will normally tend to invert the bucket.

In order to maintain the bucket in an upright position, a lever 19 is carried by a shaft 20 that is journaled in a base portion 21 of one of the hooks 16 and has a latch 22 adapted to engage a notch 23 in a cam 24 mounted on one side of the bucket 17. When the lever 19 is moved so the latch 22 is withdrawn from the notch 23, the bucket will be inverted by gravity and the load will be discharged.

The mechanism for releasing the latch 22 is actuated by a station selector 25 slidably, but not rotatably, mounted on a hexagonal rod 26 that is journaled in bearings 27—27 secured to each of the supports 3. The station selector 25 is adjustable transversely along the rod 26 to determine the particular stations at which the load will be discharged.

A lever 29 on one end of the rod 26 is connected to a similar lever 30 on the shaft 20 by a link 31. As may readily be seen, movement of the station selector will rotate the rod 26, moving the lever 29 which acts through the link 31 to move the lever 30 and rotate the shaft 20, thereby releasing the latch 22 and permitting the bucket 17 to be inverted and discharge its load.

The axis of the cam 24 is eccentric with respect to the axis of the trunnions 18. Thus when the bucket 17 is inverted, the cam 24 moves a follower 32 on lever 19 which in turn rotates the shaft 20 causing the lever 30, acting through link 31, lever 29 and rod 26 to move the station selector to an inoperative position as shown in dotted lines in Figure 2. The station selector is held in this position as long as the bucket remains in its inverted position. The station selector carries a stud 33 at its upper portion which, when the station selector is in operative position, is adapted to engage a station tripping mechanism to actuate the latch releasing mechanism and cause the load to discharge as has just been described. A tension spring 34 has one end connected to the lever 30 and its other end to support 3. The force of the spring 34 holds the latch 22 in the notch 23 when the bucket is in its upright position, and holds the follower 32 against the cam 24 when the bucket is inverted.

Each work station in the system is equipped with a station tripping mechanism supported by a pair of angle iron members 35—35 extending transversely of the track 1 and spaced longitudinally thereof. Brackets 36—36 on the ends of the angle members 35 hold bearings 37—37 in which is rotatably mounted a hexagonal rod 38 extending transversely of the track 1.

A pair of plates 40—40 are secured to the rod 38 and extend downwardly into the path of the stud 33 on the station selector 25. The plates 40 are arranged in spaced relation on the rod 38 so they are disposed on opposite sides of a latch plate 41, that extends downwardly from the angle members 35. A weight 42 is carried by a rod 43 that extends from one of the plates 40. The weight 42 tends to move the tripping mechanism to an inoperative position out of the path of the station selector, as shown in dotted lines in Figure 2.

The tripping mechanism is normally held in its operative position by a latch 44 that is pivotally supported at 45 between the plates 40 and engages the latch plate 41. The latch lever 44 is connected by a link 46 to a lever 47 that is pivotally supported between the plates 40 at 48. The lever 47 has a portion 49 arranged to slide beneath the stud 33 on the station selector 25.

As the carriage approaches a work station with a load of material in the bucket 17, the stud 33 engages the plates 40 thereby actuating the latch releasing mechanism on the carriage and causing the latch 22 to be withdrawn from the notch 23. The bucket is then inverted by gravity and the load is discharged. The rotation of the cam 24, while the bucket is being inverted, causes the station selector 25 and the stud 33 to move downwardly toward their inoperative position. As the stud moves downwardly, it engages portion 49 of lever 47 which acts through the link 46 to move the latch lever 44 against the force of a tension spring 50. This movement releases latch lever 44 from the latch plate 41 and the weight 42 then causes the tripping mechanism to move to its inoperative position.

The movement of the tripping mechanism to inoperative position is controlled by a suitable cushioning and check device 51, of any well known type, that is supported by a bracket 52 on one of the angle members 35. This check device has its piston rod 53 connected to a lever 54 mounted on the rod 38 to regulate the speed as well as the limit of the movement of the tripping mechanism.

The carriage is steadied and prevented from swinging as it passes the work station by the engagement of horizontal and vertical guide wheels 6 and 7 with vertical and horizontal flanges of guide rails 56 that are secured to supports 57—57 on opposite sides of the track 1.

It will be noted that after the material is discharged from the bucket 17 at a work station, both the station selector 25 on the carriage and the plates 40 of the tripping mechanism at the work station are automatically moved to an inoperative position. This prevents other loaded carriages from discharging material at the station, and also prevents empty carriages from releasing the tripping mechanism at other work stations. When a work station is in need of additional material, the operator may reset the tripping mechanism by pulling operating handle 58 that is connected to a lever 59 on the rod 38. This rotates the tripping mechanism to its operative position where it is held by engagement of the latch lever 44 with the latch plate 41.

In order to provide for the selective dispatch of the carriage from the loading station to certain work stations, the station selector 25 may be moved transversely of the carriage to different positions on the rod 26, as shown in dotted lines in Figure 1. The tripping mechanisms at the different work stations are arranged in different positions transversely of the track 1, as shown in dotted lines in Figure 1, so the tripping mechanism at each station is in longitudinal alignment with one of the positions of the station selector 25.

As previously stated, the conveyer illustrated is for the distribution of four different types of tobacco from a loading station in a storage room to a number of work stations at which various machines are located. For convenience in describing the operation of the system, the four classes or types of tobacco will be referred to as A, B, C and D. The tripping mechanisms at the work stations using type A tobacco are arranged in the full line position A' in the drawings. The tripping mechanisms at stations using types B, C and D tobacco are arranged in the dotted line positions B', C' and D', respectively.

When an empty carriage approaches the loading station, the empty bucket is removed and a loaded bucket is placed on the carriage in upright position where it is held by the latch 22. The station selector 25 is moved transversely to its position on the rod 26 that corresponds to the type of tobacco in the bucket. Assuming the bucket contains type A tobacco, the station selector will be moved to position A'. The carriage is moved along the track 1 until it comes to a work station having its tripping mechanism at position A'. If the tripping mechanism is in operative position, the tobacco will be discharged. Otherwise, the carriage will continue until it comes to a station having its tripping mechanism in the A' position and also set in operative position.

It will be seen that the above described system provides for the distribution of several different types of material to certain selected stations, and mechanism at the stations under the control of the operator for causing the load to be discharged.

Figure 3:
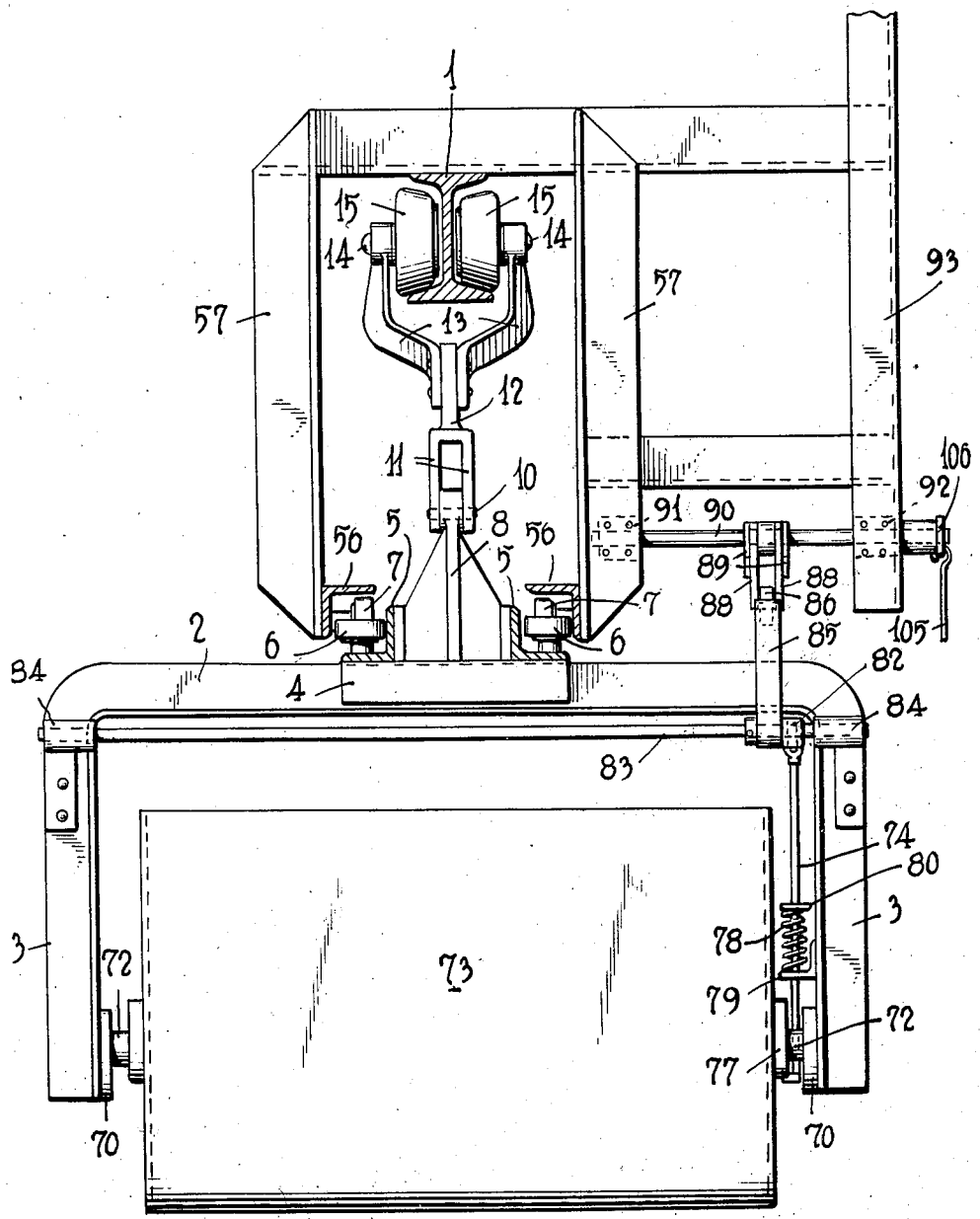
Figure 3 is a front elevation of a modified form of carrier approaching a work station.

In Figures 3 and 4, a modified form of the invention is illustrated. This modification is similar in its broader aspects to the conveyer system already described, but differs in some of the more specific details of the latch releasing mechanism on the carriage and the tripping mechanism at the work stations.

The carriage shown in this modified form of the invention and the structure by which it is suspended from the track 1, as well as the arrangement of the guide wheels 6 and 7 and guide rails 56, are substantially the same as those described above, so a further description is unnecessary.

A pair of arms 70—70 are secured to each of the supports 3 of the carriage framework. The arms 70 are formed with notches 71 that are adapted to receive trunnions 72 secured to opposite sides of a load carrying bucket 73. With this arrangement, the bucket may be easily removed from the carriage by lifting the trunnions 72 out of the notches 71.

The trunnions 72 are located below and to one side of the center of gravity of the bucket so the weight of the bucket and the load therein tends to invert the bucket. In order to hold the bucket in upright position, a rod 74 carried by one of the supports 3 has a latch 75 adapted to engage a notch 76 in a cam 77 secured to one side of the bucket 73. The rod 74 is slidable with respect to the support 3 and is normally forced upwardly by a compression spring 78 that surrounds the rod 74 between a bracket 79 on the support 3 and a collar 80 on the rod 74.

The upper end of the rod 74 is pivotally connected at 81 to a lever 82 that is carried by a hexagonal rod 83. The rod 83 extends transversely of the carriage and is journaled in bearings 84—84 on the supports 3. A station selector 85 is slidably, but not rotatably, adjustable on the rod 83. When the station selector 85 engages a tripping roller 86 at a work station, the rod 83 and lever 81 are rotated, thereby moving the rod 74 downwardly against the force of the spring 78 and withdrawing the latch 75 from the notch 76. This permits the bucket to be inverted to discharge material.

As the bucket inverts, the cam 77 forces the latch 75 and rod 74 downwardly and holds them down by the engagement of the latch 75 in a notch 87 in the cam 77. This holds the station selector in an inoperative position so it will not engage the tripping roller 86 at other work stations as the carriage, with its empty bucket, continues along the track 1.

The tripping roller 86 is a part of a station tripping mechanism and is supported between a pair of levers 88—88 that are pivotally connected to a pair of arms 89—89 carried by a transversely disposed rod 90 which is journaled in bearings 91 and 92 on one of the supports 57 and an upright 93, respectively. A counterweight 95 is carried by an arm 96 that is mounted on the rod 90. The counterweight tends to rotate the rod 90 to move the tripping mechanism to an inoperative position, as shown in dotted lines in Figure 4, where the roller 86 will not engage the station selector 85 on the carriages.

The roller 86 is normally held in an operative position by a latch 97 that engages an abutment 98 carried by a bracket 99 on the framework of the conveyer. The latch 97 is secured to one end of a rod 100 that is carried by brackets 101 and 102 on the arms 89 and is slidable relative thereto. The other end of the rod 100 is pivotally connected to the levers 88 so engagement of the roller 86 with the station selector 85 causes the latch to be withdrawn from the abutment 98 and the tripping mechanism to be moved to its inoperative position, as shown in dotted lines in Figure 4. A compression spring 103 surrounds the rod 100 between a collar 104 and the bracket 102 thereby forcing the rod and latch toward the abutment.

As is apparent from the foregoing description, a carriage with a loaded bucket moves along the track until the station selector 85 engages the roller 86 at a work station whereupon the bucket is inverted to discharge the load and both the station selector and the tripping roller are automatically moved to inoperative positions. The station selector is returned to its operative position after the empty bucket is removed and a loaded bucket is placed in the carriage. The tripping roller may be returned to its operative position by pulling an operating lever 105 that is connected to an arm 106 on the rod 90.

As clearly shown in dotted lines in Figure 3, the tripping mechanisms at the various stations may be arranged at different positions transversely of the track 1, and the station selector may be adjusted transversely on the rod 83 to be aligned longitudinally with certain rollers 86 for selectively dispatching the load to particular stations. The operation of this modified form of my invention in distributing different classes of material to selected work stations is substantially the same as that already described in connection with the first mentioned conveyer system.

Instead of setting the station selectors 25 and 85 at certain transverse positions each time a loaded bucket is placed in the carriage, the selectors may be fixed at one transverse position on each carriage and the carriages marked A, B, C or D, depending upon whether the selectors are placed in positions A', B', C' or D'. The number of carriages having their selectors fixed in each position is determined by the quantity of each type of material that is required for machines serviced by the system.

When the system is used in this manner, the operator at the loading station places buckets containing class A material only in carriages marked A, class B in carriages marked B, etc.

Thus, a carriage with a bucket containing class A material continues along the track until it comes to a work station using class A material and which has its tripping mechanism in operative position, whereupon the bucket is inverted and the material is discharged.

What I claim is:

1. In a conveyer system, a carriage movable along a track, a bucket in said carriage for transporting material from a loading station to a plurality of work stations adjacent said track, a latch for holding said bucket in upright position, mechanism for releasing said latch to invert said bucket thereby discharging the material, a station selector for actuating said mechanism upon engagement with a tripping mechanism at one of said work stations, means tending to move said tripping mechanism toward an inoperative position, a second latch for holding said tripping mechanism in operative position, a cam rotatable with said bucket, and a follower connected to said latch releasing mechanism and actuated by said cam when material is discharged from the bucket to move said station selector toward an inoperative position, said movement causing engagement of said station selector with a lever to release said second latch and permit said tripping mechanism to move to an inoperative position.

2. In a conveyer system, a carriage movable along a track, a bucket in said carriage for transporting material from a loading station to a plurality of work stations adjacent said track, a latch for holding said bucket in upright position, mechanism for releasing said latch to invert said bucket thereby discharging the material, a station selector for actuating said mechanism upon engagement with a tripping mechanism at one of said work stations, means tending to move said tripping mechanism toward an inoperative position, a second latch for holding said tripping mechanism in operative position, said station selector being adjustable transversely of said carriage for longitudinal alignment with the tripping mechanism at a selected work station, a cam rotatable with said bucket, and a follower connected to said latch releasing mechanism and actuated by said cam when material is discharged from the bucket to move said station selector toward an inoperative position, said movement causing engagement of said station selector with a lever to release said second latch and permit said tripping mechanism to move to an inoperative position.

3. In a conveyer system, a carriage movable along a track, a bucket supported by said carriage for transporting material from a loading station to a plurality of work stations adjacent said track, a latch for holding said bucket in upright position, mechanism for releasing said latch to invert said bucket thereby discharging the material, said mechanism including a station selector mounted for adjustment transversely of the carriage and movable about the axis of said mounting to actuate said latch upon engagement with a tripping mechanism at one of said work stations, means tending to move said tripping mechanism toward an inoperative position, a second latch for holding said tripping mechanism in operative position, and means actuated by movement of the bucket to discharge position for moving said station selector toward an inoperative position, said movement serving also to release said second latch and permitting said tripping mechanism to move to an inoperative position.

4. In a conveyer system, a carriage movable along a track, a bucket supported by said carriage for transporting material from a loading station to a plurality of work stations adjacent said track, a latch for holding said bucket in upright position, mechanism for releasing said latch to invert said bucket thereby discharging the material, a station selector for actuating said mechanism upon engagement with a tripping mechanism at one of said work stations, means tending to move said tripping mechanism toward an inoperative position, a second latch for holding said tripping mechanism in operative position, a cam rotatable with said bucket, and a follower connected to said latch releasing mechanism and actuated by said cam when material is discharged from the bucket to move said station selector toward an inoperative position, said movement causing engagement of said station selector with an element of said second latch to release the same and permit said tripping mechanism to move to an inoperative position.

CLIFFORD P. KUMLER.